United States Patent [19]

Adkison et al.

[11] 4,359,807
[45] Nov. 23, 1982

[54] MEAT GRISTLE PULLER

[75] Inventors: Frank L. Adkison, West Liberty; Jack L. Kress, Wilton, both of Iowa

[73] Assignee: Oscar Mayer Foods Corporation, Madison, Wis.

[21] Appl. No.: 258,042

[22] Filed: Apr. 28, 1981

[51] Int. Cl.³ .............................................. A22C 21/00
[52] U.S. Cl. ....................................... 17/1 R; 17/1 G; 17/46; 17/11.3
[58] Field of Search ............... 17/1 R, 1 G, 11 C, 46, 17/11.3

[56] References Cited

U.S. PATENT DOCUMENTS

| | | | |
|---|---|---|---|
| 2,694,219 | 11/1954 | Mayer | 17/11.3 |
| 2,705,339 | 4/1955 | Stauffer | 17/11.3 |
| 3,277,516 | 10/1966 | Belknap | 17/11.3 |
| 3,510,908 | 5/1970 | Segur et al. | 17/1 G X |
| 3,613,153 | 10/1971 | McDonald | 17/11.3 |

Primary Examiner—Willie G. Abercrombie
Attorney, Agent, or Firm—Lockwood, Dewey, Alex & Cummings

[57] ABSTRACT

An apparatus is provided for pulling gristle such as tendons from cuts of meat by mechanically holding down an extending portion of the gristle as the cut of meat traverses a path that intersects the location of a wedging jaw that prevents continued traversal of the meat along the path while permitting continued movement of the gristle along the path until it is stripped from the meat. In an optional embodiment, the jaw is a mechanical one that closes to form the wedging jaw that strips the gristle from the meat, after which the jaw opens to release gristle therefrom that otherwise might have been undesirably retained therein.

20 Claims, 5 Drawing Figures

MEAT GRISTLE PULLER

BACKGROUND AND DESCRIPTION OF THE INVENTION

This invention generally relates to an apparatus for removing gristle from meat. More particularly, this invention relates to an apparatus for removing gristle such as tendons from cuts of meat, especially poultry meat, by using a wedging jaw that permits passage of the gristle and not the meat therethrough to subject the meat and the gristle to oppositely directed forces whereby the gristle is stripped from the meat.

Certain cuts of meat are of reduced value by virtue of their including gristle such as tendons or cartilage tissues. Removal of this gristle has long been known to be desirable, especially when preparing boned products such as poultry breasts and poultry tenderloin products, which products have at least one rather extensive unitary gristle portion, such as the tendon and connective tissue associated therewith which extends generally medially through a turkey tenderloin. Such tendons and the like are particularly difficult to remove by hand butchering operations without damaging the meat, because such gristle is in large measure imbedded within and tenaciously adhered to the tenderloin.

Accordingly, it has been recognized that a desirable manner of removing these gristle portions from cuts of meat is to grasp an accessible portion of the gristle and then pull on that accessible portion to remove the entire gristle from the cut of meat. Heretofore, operations such as these have been rather cumbersome and slow. Accordingly, there is a need for means to strip gristle from cuts of meat in a manner that is fast, effective and efficient and that is not labor intensive.

The present invention satisfies these needs by providing an apparatus having mechanical means for holding down an extending or a leading portion of gristle attached to a piece of meat as the piece of meat traverses a path that passes by a wedging jaw that holds the meat to prevent its continued traversal along the path while the mechanical hold down means continues to hold the gristle and to move along the path to strip the gristle from the piece of meat, after which the meat and the stripped gristle are collected separately from each other. Optionally, the wedging jaw can be opened after the stripping has been completed in order to facilitate removal of the stripped gristle from the apparatus.

Accordingly, an object of the present invention is to provide an apparatus for stripping gristle from pieces of meat.

Another object of the present invention is to provide an improved apparatus for cleanly and rapidly stripping gristle simultaneously from several cuts or pieces of meat.

Another object of this invention is to provide an improved apparatus for efficiently pulling the tendon from a poultry meat tenderloin.

Another object of the present invention is an improved apparatus for upgrading the quality of meat products by stripping gristle from cuts of meat, and especially by removing tendons at least partially imbedded within the meat.

Another object of the present invention is an improved apparatus which removes gristle from cuts of meat by subjecting the gristle and the meat to oppositely directed forces in a manner that is positive, rapid, efficient and not labor intensive.

Another object of this invention is an improved apparatus for wedgingly separating gristle from cuts of meat.

These and other objects of the present invention will become apparent from the following detailed description and drawings, wherein.

Figure 1:
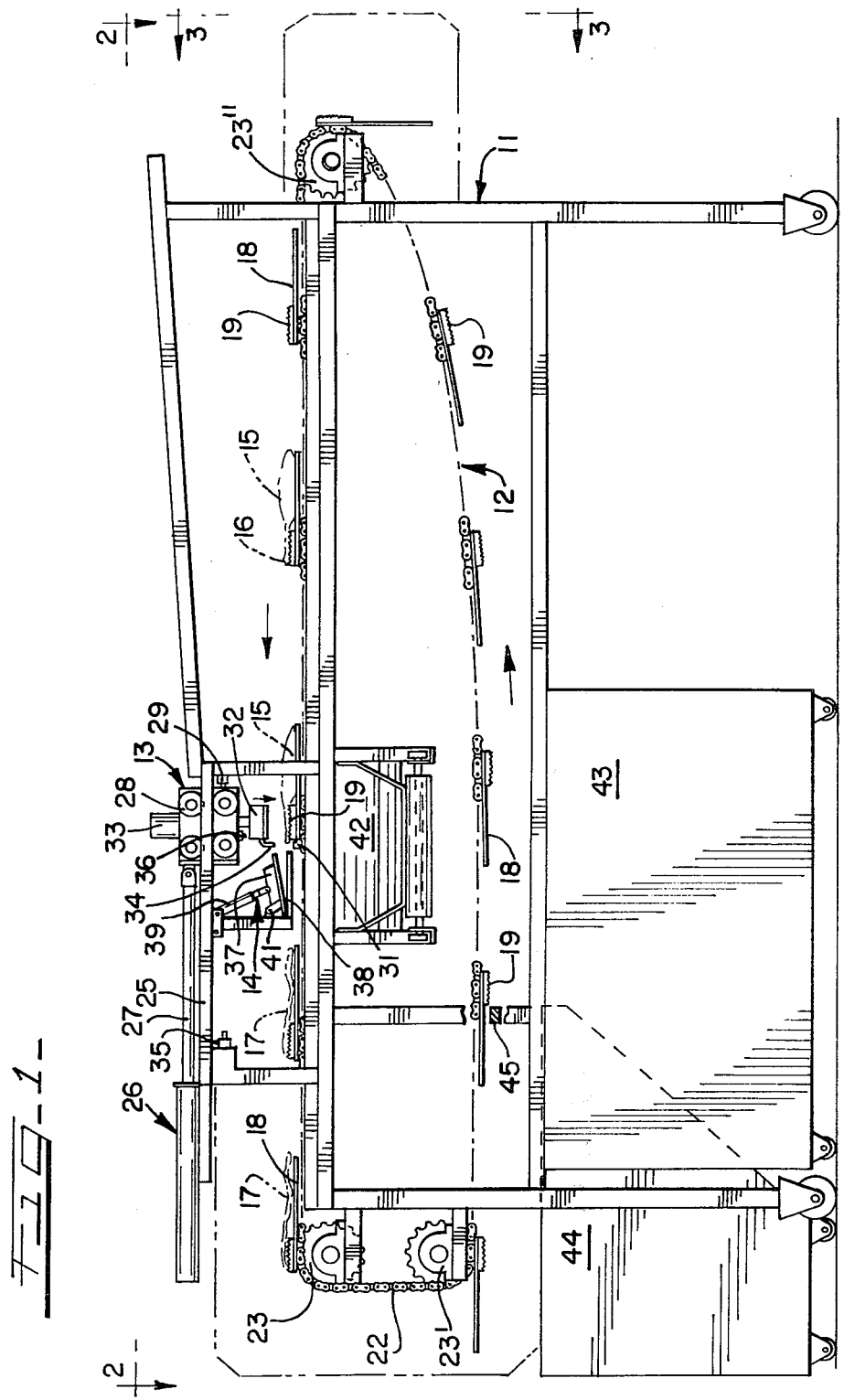
FIG. 1 is a side elevation view of the preferred apparatus according to this invention, showing a piece of meat under a hold-down assembly prior to complete implementation of the hold down assembly and before the meat engages the jaw member.
Figure 4:
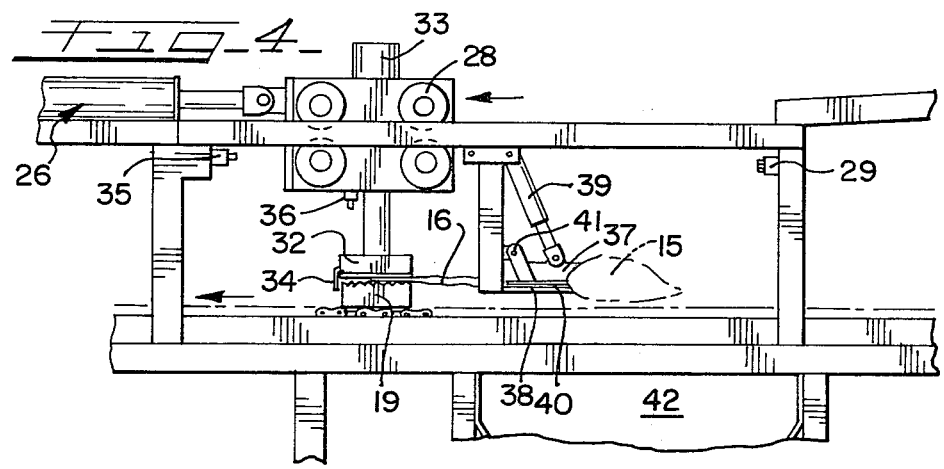
Figure 5:
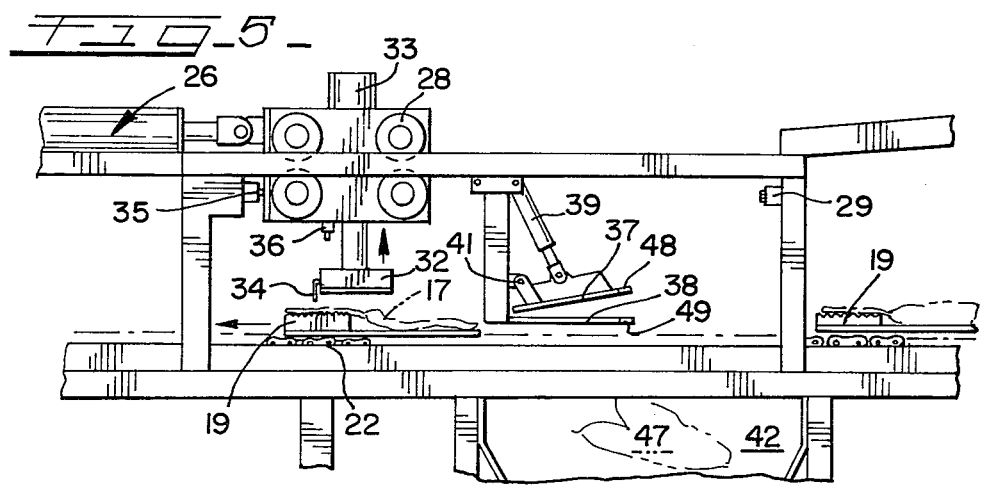

FIG. 4 is a side elevation detail view of the apparatus of FIG. 1, showing the jaw member wedging action as the hold down assembly is closed onto the gristle and as the apparatus is stripping the gristle from the meat; and FIG. 5 is a side elevation detail view of the apparatus shortly after the gristle has been stripped free of the meat and the hold down assembly has released the stripped gristle.

The apparatus according to this invention is illustrated in FIGS. 1-5. Included is a support means, generally designated 11, to which are affixed conveyor means, generally indicated at 12, a movable hold-down assembly, generally designated as 13, and wedging jaw means, generally shown at 14. Cuts of meat 15 are shown resting on the conveyor means 12, each cut 15 having gristle 16 which is grasped by the hold down assembly 13 before the cut 15 engages the wedging jaw means 14 to be held thereby as the movable hold down assembly 13 continues to move with the conveyor means 12 away from the wedging jaw means 14 until stripped gristle 17 is free of the meat, after which the movable hold down assembly 13 releases the stripped gristle 17 and then moves in a direction generally opposite to movement of the conveyor means 12, until it is in position for the stripping cycle to be repeated.

Conveyor means 12, which traverses a path generally along the length of the support means 11, includes a plurality of tray members 18, each having a plate 19 mounted thereon. Preferably, each plate 19 has a high-friction or gripping top surface such as the knurled surface shown in the drawings with its grooves oriented in a direction transverse to the path of the conveyor means 12. As can be seen from FIG. 2, tray members 18 are affixed to the conveyor means 12. Actual attachment can be facilitated, as illustrated, by providing extensions 21 to each of the tray members 18. Conveyor means 12 should be of a relatively precisely acting type whereby its speed of movement can be accurately controlled, such as the illustrated conveyor system that includes roller chains 22 that are driven by sprockets 23, 23′, 23″, which sprockets are in turn driven by a gear drive unit 24 capable of driving the sprockets at a predetermined and desired speed to appropriately interact with the movable hold-down assembly 13 and the wedging jaw means 14.

Movable hold down assembly 13, which traverses a controlled path, preferably guided along a rail 25, is in operative interengagement with driving means 26, typically taking the form as illustrated of a pneumatic cylinder having an extended piston rod 27. Movability is imparted to the assembly 13 by any suitable friction reducing means, which can conveniently take the form of a trolley as illustrated, having rollers 28 that rotate along the rail 25 such that the assembly 13 traverses a distance that substantially conforms to the length of the rail 25. Driving means 26 provides a bias in favor of extension of the rod 27 out of the driving means 26, such bias being adequate to move the assembly 13 toward and preferably into engagement with a stop 29.

A first microswitch 31, which is mounted to the support means 11 at a location near the conveyor means 12 and upstream of the jaw means 14, is tripped by each tray member 18 or its extension 21 shortly prior to the time that its plate 19 is in general vertical alignment with a foot member 32 of the assembly 13. Preferably, the foot member 32 has a high friction or gripping bottom surface such as the knurled surface illustrated, which preferably has grooves running in a direction transverse to those of the preferred knurled surface of each plate 19. First switch 31 activates a double acting cylinder 33 of the assembly 13 in order to move the foot member 32 downwardly into general engagement with the plate 19, at which time a catch member 34 engages the plate 19.

Since the plate 19 is affixed to and is moving with the conveyor means 12, when the foot member 32 contacts the plate 19, it imparts a force both on the bottom of the foot member 32 and on the catch member 34 whereby the foot member 32 and the entire movable hold down assembly 13 move in opposition to the bias of the driving means 26, such movement being toward, alongside, and then beyond the wedging jaw means 14 and continuing until the hold down assembly 13 activates a second microswitch 35, which in turn activates the double acting cylinder 33 to immediately raise the foot member 32 whereby the catch member 34 clears the plate 19 as it continues its path with the conveyor means 12, while the hold down assembly stops moving in opposition to the bias of the driving means 26.

The foot member 32 continues upwardly until it activates a third microswitch 36 that releases the driving means 26 to move the hold down assembly 13 in the direction toward stop 29 and away from second microswitch 35. Thereafter, this cycle is repeated, each cycle being initiated by activation of the first microswitch 31 by each respective tray member 18 or its extension 21, the gear drive unit 24 of the conveyor means 12 being adjusted to a predetermined speed such that the hold down assembly 13 has returned to the vicinity of the stop 29 before the first microswitch 31 is activated.

Wedging jaw means 14 is positioned so as to project into the pathway of the plates 19 and the cuts of meat 15 lying thereon, this positioning being such that the cut of meat 15 remains in front of and does not pass through the wedging jaw means 14, illustrated in FIG. 4, while the gristle 16 passes through and/or is positioned generally behind the wedging jaw means 14 until the gristle is stripped free of the meat, after which the stripped gristle 17 leaves the jaw means 14. While jaw means 14 can be stationary and still accomplish its wedging function, the removal of the stripped gristle 17 therefrom is facilitated if the jaw means 14 is mechanical to the extent that it is capable of being opened and closed as illustrated.

Jaw means 14 that is of the mechanical type includes an upper jaw 37 that moves with respect to a lower jaw 38 which is preferably stationary. With this arrangement, the upper jaw member 37 closes downwardly toward the lower jaw member 38, but this closure is incomplete in order to form a narrow wedge opening 40 therebetween. FIG. 4 illustrates the closed position of the jaw means 14 and the wedge opening 40, while FIG. 5 illustrates the open position thereof, such open position being provided to facilitate release of the stripped gristle 17 from the jaw means 14.

Movement of the upper jaw 37 downwardly to form the wedge opening 40 is accomplished when the first microswitch 31 is activated to provide for pivotal movement of the upper jaw 37 about a pivot 41 through the action of a cylinder 39 which is preferably of the single-acting type. After stripping has been completed, the hold down assembly 13 will have activated the second microswitch 35 which signals the cylinder 39 to move the upper jaw member 37 upwardly about its pivot 41. This opening of the jaw means 14 widens the wedge opening 40 to provide a larger passageway by which the stripped gristle 17 can become free and clear of the jaw means 14. Should stripped gristle thereafter remain within the jaw means 14, removal of other gristle during the next cycle will usually also remove any gristle remaining in the jaw means 14 from the previous cycle.

Meat cuts fall through an opening 46 (FIG. 2) once the stripped gristle 17 has been removed therefrom, which is due in large measure to the fact that the meat cuts 15 are suspended in front of the wedging jaw means by the gristle when the gristle is pulled out of the meat 15. Preferably, such collection is facilitated by a belt conveyor 42 which transports the stripped meat cuts 47 into a collection bin 43. Stripped gristle 17 remains on tray members 18 until they pass over sprocket 23, after which the stripped gristle 17 will typically fall by gravity into a disposal bin 44. In the event that a stripped gristle 17 does not fall by gravity, because it is tenaciously held by the knurled surface of the plate 19, same will be removed from the plate 19 by a scrapper bar 45 positioned about the disposal bin 44.

Figure 2:
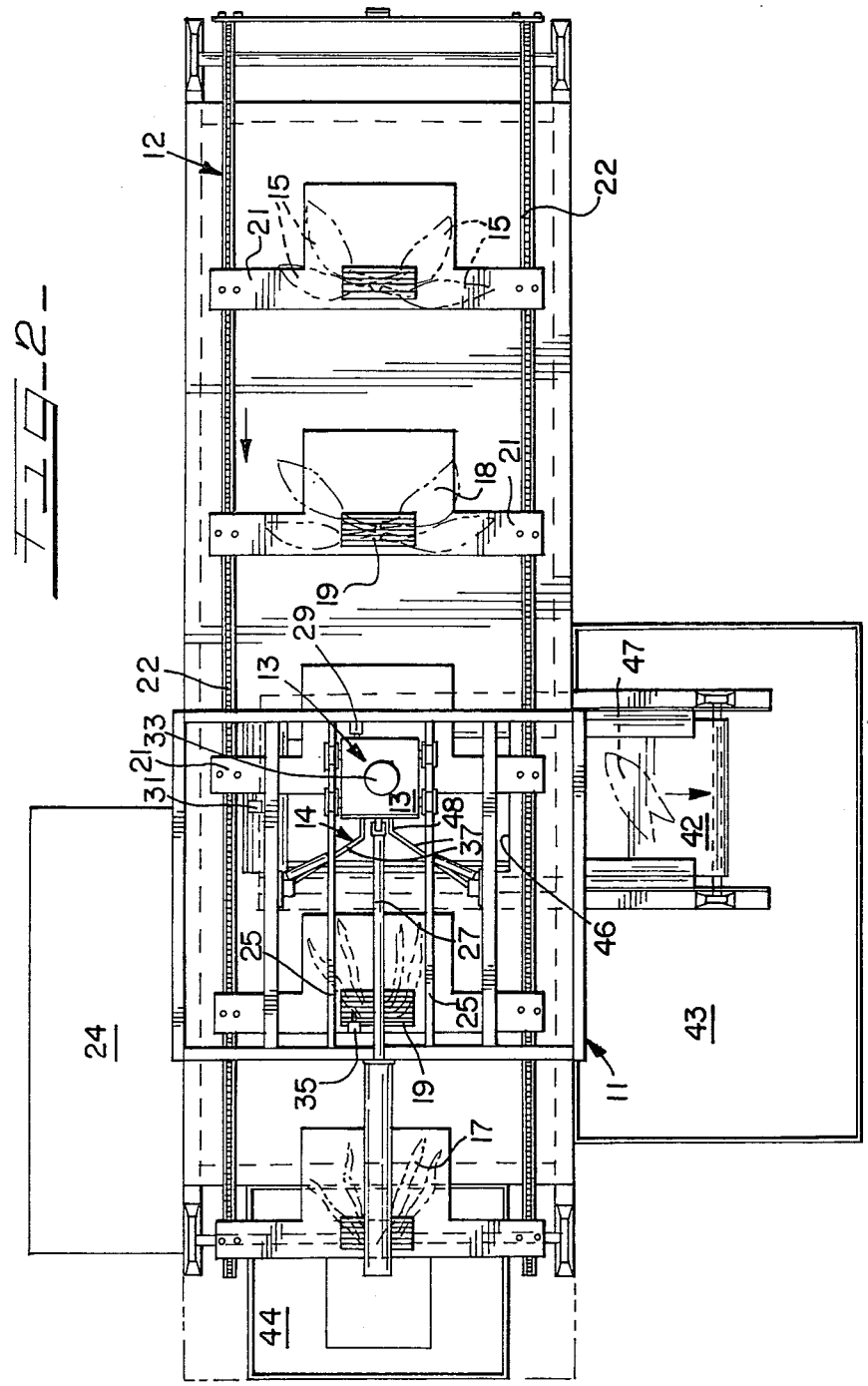
FIG. 2 is a plan view of FIG. 1.
Figure 3:
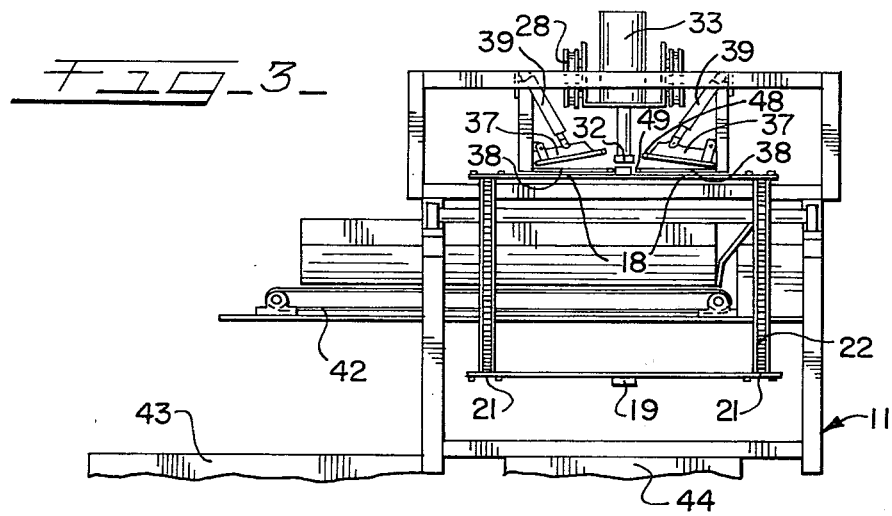
FIG. 3 is an end elevation view of the apparatus of FIG. 1.

With more particular reference to the wedging jaw means 14, same preferably includes jaw members that have bent free ends 48 and 49 that generally overlie each plate 19 as it passes under the wedging jaw means 14 along the preselected length. Such bent free ends 48 and 49 are oriented generally longitudinally of the coveyor means 12 while each jaw member is preferably mounted at an acute angle with respect to the longitudinal axis of the conveyor means 12, as illustrated in FIG. 2, the acute angle being such that the free ends of jaw members are upstream of their attached ends. By this structure, the wedging jaw means 14 rakes the gristle 16 from the meat 15 in a manner that is especially efficient and positive since the acutely angled arrangement urges the meat cuts 15 into the narrow wedge opening 40 for stripping of the gristle 16 therefrom.

In operation, the worker places one or more, and preferably four, cuts of meat onto a tray member 18, positioning the cuts of meat such that gristle 16 thereof extends onto the plate 19. This positioning of the meat cuts 15, which is well illustrated in FIG. 2, is typically accomplished while the conveyor means 12 is in operation. The stripping cycle is begun when the tray member 18 or, when provided, the extension 21 thereof, activates the first microswitch 31, to thereby drop the foot member 32 into position on top of the plate 19 in order to sandwich the extended portion of the gristle 16 between the plate 19 and foot member 32. At this point, the foot member 32 moves with the respective tray member 18 in order to firmly hold the gristle 16 between the plate 19 and the foot member 32 as the particular tray member 18 continues its movement with the conveyor means 12 to the wedging jaw means 14.

At the time that a cut of meat 15 on the tray member 18 reaches the location of the wedging jaw means 14, the gristle 16 passes into the narrow wedge opening 40 and through the jaw means 14, but the meat portion thereof does not pass therethrough, with the result that continued movement of the conveyor member 12 and the tray member 18 attached thereto pulls the stripped gristle 17 out of the meat, whereupon the meat falls for collection into the bin 43. The stripped gristle 17 continues to move on and with the conveyor means 12 until the second microswitch 35 is activated in order to raise the foot member 32 and, if the wedging jaw means 14 is a mechanical one that opens and closes, also to open the jaw means 14 in order to facilitate release of the stripped gristle 17. Upward movement of the foot member 32 frees the stripped gristle 17 from its sandwiched condition between the plate 19 and the foot member 32, which stripped gristle 17 is subsequently collected within the bin 44. Once the foot member 32 is raised enough to activate the third microswitch 36, the movable hold down assembly 13 returns to its location toward the stop 29 to begin a further stripping cycle when the next tray member 18 activates the first microswitch 31.

This invention can be embodied in various forms, and therefore, is to be construed and limited only by the scope of the appended claims.

We claim:

1. An apparatus for removing gristle from cuts of meat, wherein the apparatus comprises:
   support means;
   conveyor means affixed to said support means, said conveyor means having a tray member for supporting a cut of meat, said tray member traversing a longitudinal path;
   a hold down assembly movably mounted on said support means at a location above a preselected length of said conveyor means and for cyclical general alignment with and operative interengagement of said tray member to sandwich a portion of gristle of a cut of meat therebetween; and
   wedging jaw means attached to said support means at a location along said preselected length, said wedging jaw means being for generally intersecting said longitudinal path of the tray member and for permitting passage of the gristle while preventing passage therethrough of the cut of meat on said tray member to thereby remove said gristle from the meat.

2. The apparatus of claim 1, wherein said hold down assembly is movably mounted along a rail generally parallel to said tray member longitudinal path, said rail having an operative length generally equal to said preselected length of the conveyor means.

3. The apparatus of claim 1, wherein said hold down means includes a trolley assembly in operative interengagement with an extending rod of a driving means for moving said trolley assembly along a path spaced from said tray member.

4. The apparatus of claim 1, wherein said hold down means includes a foot member, and wherein said hold down means has a cyclical mode of operation whereby said foot member engages said tray member while the tray member traverses a portion of said preselected length.

5. The apparatus of claim 1, wherein said tray member includes a plate having a gripping top surface and said hold down assembly has a gripping bottom surface, said gripping surfaces cyclically cooperating with each other to frictionally engage each other while the portion of gristle is sandwiched therebetween.

6. The apparatus of claim 5, wherein said gripping top surface of the plate is knurled with grooves oriented in a direction generally transverse to said longitudinal path of the tray member.

7. The apparatus of claim 5, wherein said gripping bottom surface of the hold down assembly is knurled with grooves oriented in a direction generally longitudinal to said longitudinal path of the tray member.

8. The apparatus of claim 1, wherein a stop for said hold down means is provided at a location generally corresponding to an upstream end of said preselected length of the conveyor means, and wherein said hold down means is in operative interengagement with a driving means for biasing said hold down means toward said stop.

9. The apparatus of claim 1, wherein said tray member and said hold down assembly cyclically frictionally engage each other, whereby movement of the tray member is imparted to the hold down assembly to move said hold down assembly in a direction toward, adjacent to, and then away from said wedging jaw means.

10. The apparatus of claim 1, wherein said wedging jaw means has a narrow wedge-shaped opening between an upper jaw member and a lower jaw member, which jaw members and wedge-shaped opening project into the longitudinal path of the tray member.

11. The apparatus of claim 1, wherein said wedging jaw means has an upper jaw member and a lower jaw member, said jaw members each having a bent free end.

12. The apparatus of claim 1, wherein said tray member has a plate mounted thereon, and wherein said wedging jaw means has a bent free end that generally overlies said plate as it passes the wedging jaw means along said preselected length.

13. The apparatus of claim 1, wherein said tray member has a plate mounted thereon, and wherein said wedging jaw means has a bent free end that is oriented generally longitudinally of said tray member longitudinal path.

14. The apparatus of claim 1, wherein said wedging jaw means includes a jaw member mounted at an acute angle with respect to said longtudinal path of the tray member.

15. The apparatus of claim 1, wherein said wedging jaw means includes a jaw member mounted at an acute angle with respect to said longitudinal path of the tray member, said jaw member having a bent free end generally parallel to said longitudinal path of the tray member.

16. The apparatus of claim 1, wherein said wedging jaw means has a hook-like free end that projects into said longitudinal path of the tray member.

17. The apparatus of claim 1, wherein said wedging jaw means includes dual jaw members having free ends located generally opposite of each other.

18. The apparatus of claim 1, wherein said wedging jaw means includes an upper jaw member and a lower jaw member, said upper jaw member being movable with respect to said lower jaw member.

19. The apparatus of claim 1, wherein said wedging jaw means is mechanical, having an opened position and having a closed position forming a narrow wedge-shaped opening.

20. The apparatus of claim 1, wherein first switch means for initiating tray member engaging movement of a foot member of said hold down assembly is mounted along said conveyor means in switch activating communication with said tray member, second switch means for initiating tray member disengaging movement of said foot member is mounted in switch activating communication with said hold down assembly at a location generally corresponding to a downstream end of said preselected length of the conveyor means, and third switch means for initiating movement of the hold down assembly toward a location generally corresponding to an upstream end of said preselected length of the conveyor means is mounted for switch-activating communication with said foot.

* * * * *